United States Patent
Laughman et al.

(10) Patent No.: US 7,280,569 B2
(45) Date of Patent: Oct. 9, 2007

(54) ELECTRO-OPTICAL MODULATOR MODULE FOR $CO_2$ LASER Q-SWITCHING, MODE-LOCKING, AND CAVITY DUMPING

(75) Inventors: Lanny Laughman, Bolton, CT (US); Thomas V. Hennessey, Jr., Lebanon, CT (US); Joseph S. Smucz, East Hartford, CT (US); Vernon A. Seguin, Windsor, CT (US); Raymond Michaud, Lebanon, CT (US)

(73) Assignee: Coherent, Inc., Santa Clara, CA (US)

( * ) Notice: Subject to any disclaimer, the term of this patent is extended or adjusted under 35 U.S.C. 154(b) by 268 days.

(21) Appl. No.: 10/886,902

(22) Filed: Jul. 8, 2004

(65) Prior Publication Data

US 2006/0007966 A1    Jan. 12, 2006

(51) Int. Cl.
   *H01S 3/115* (2006.01)
(52) U.S. Cl. .......................................... 372/12; 372/35
(58) Field of Classification Search .................. 372/12, 372/35; 359/237, 321, 322, 245, 253, 254
   See application file for complete search history.

(56) References Cited

U.S. PATENT DOCUMENTS

| | | | |
|---|---|---|---|
| 4,229,079 A * | 10/1980 | Wayne et al. ................ 359/245 |
| 4,849,719 A * | 7/1989 | Belek et al. ................. 359/245 |
| 5,351,251 A * | 9/1994 | Hodgson ........................ 372/4 |
| 5,680,412 A | 10/1997 | DeMaria et al. ............... 372/92 |
| 6,697,408 B2 * | 2/2004 | Kennedy et al. .............. 372/55 |
| 7,039,079 B2 * | 5/2006 | Seguin et al. ................. 372/27 |
| 2003/0156615 A1 * | 8/2003 | Kennedy et al. .............. 372/55 |
| 2005/0058174 A1 * | 3/2005 | Kadoya ......................... 372/68 |
| 2005/0152426 A1 * | 7/2005 | Dell'Acqua et al. .......... 372/69 |

OTHER PUBLICATIONS

Amnon Yariv, Quantum Electronics, 3rd Edition, Chapter 14 entitled "The Modulation of Optical Radiation," publisher John Wiley & Sons (1985), pp. cover sheet, 298-321.
D.J. Kuizenga et al., "FM and AM Mode Locking of Homogeneous Laser—Part 1: Theory," *IEEE J. Quant. Electron*; vol. QE-6, Nov. 1970, pp. 694-708.
K. Stenersen et al., "FM Mode-Locked High-Pressure CW RF-Excited $CO_2$ Waveguide Laser," *IEEE Journal of Quantum Electronics*, vol. 27, No. 7, Jul. 1991, pp. 1869-1763.

* cited by examiner

*Primary Examiner*—Dung Nguyen
(74) *Attorney, Agent, or Firm*—Stallman & Pollock LLP

(57) ABSTRACT

Various electro-optical modulator module designs are presented, which can provide for uniform, symmetric, and efficient heat removal for mode-locking, Q-switching, and/or cavity dumping operations. Heat can be uniformly extracted from an EO crystal without imposing undue stress, thereby preventing birefringence and laser beam degradation. A liquid-cooling approach can be used for high-duty operations, such as mode-locking operations. Efficient heat removal can prevent thermal run-away from electrical heating of the crystal due to the large drop in the electrical resistance of CdTe with increasing temperature when operated above 50° C. RF or video arcing and subsequent damage to the EO crystal can be prevented by surrounding the crystal with a low dielectric constant material that lowers the capacitance coupling to ground, while still maintaining good thermal cooling.

24 Claims, 11 Drawing Sheets

ELECTRO-OPTICAL MODULATOR MODULE FOR CO₂ LASER Q-SWITCHING, MODE-LOCKING, AND CAVITY DUMPING

TECHNICAL FIELD OF THE INVENTION

The present invention relates to the performance of optical quality electro-optical crystals used in or with lasers and laser systems.

BACKGROUND

As laser system technology improves and laser pulses continue to shorten, drilled holes, cuts, and scribed grooves that are formed on various materials by these laser systems continues to improve accordingly. Improvements are observed, for example, in recast surface residues around the edges of these features, and in the smaller taper of the features in the material being processed. Reduction and/or elimination of micro-cracks around these features also is observed.

For the same amount of average laser power delivered to a work-piece, the cost of a laser system increases dramatically as the pulse duration decreases. The cost of a $CO_2$ laser is generally much lower than the cost of a diode pumped solid state (DPSS) laser, while the operating life time, size, weight, and reliability are comparable. For a given pulse width available from a $CO_2$ or DPSS laser, then, the wavelength of the laser becomes the discriminating parameter (in addition to cost considerations) when attempting to obtain the most favorable holes, cuts, or grooves in the material to be processed. For example, the characteristics of these features can determine whether a mid IR (i.e., $CO_2$ at 9.2 to 10.6 microns), near IR (i.e., DPSS at around 1 to 1.5 microns), visible (second harmonic of DPSS lasers), or UV (excimer or $3^{rd}$ harmonic of DPSS lasers) is selected for performing the process. Short $CO_2$ pulses also are of interest to the scientific community to probe the atomic and molecular relaxation rates.

Presently, the primary techniques used to obtain short laser pulses from a laser system include Q-switching, simultaneous Q-switching and Cavity-dumping, and mode-locking. Each of these short pulse generation techniques requires one or more electro-optical switches, or electro-optical modulators, to be inserted within the feedback cavity of the laser system. A cadmium tellurium (CdTe) crystal is presently the electro-optical crystal of choice for $CO_2$ laser systems. Performing these short pulse generation techniques in $CO_2$ lasers with CdTe crystals, however, presents problems that need to be addressed in order to maximize performance.

For example, the drive voltage for electro-optical and acousto-optical switches (or modulators) is proportional to the laser wavelength. Consequently, the modulators for $CO_2$ lasers (i.e., operating in the 9.2 to 11 micron region) require approximately 10 times more voltage than for lasers operating, for example, in the 1 micron range. The high voltage requirement complicates the design of the electro-optical crystal holder for $CO_2$ laser mode-locking and Q-switching applications, as it is necessary to prevent arcing and/or dielectric breakdown of the electro-optical crystal by either the high video voltage for Q-switching and/or cavity dumping, or by the RF voltage for mode-locking applications.

Further, the optical absorption of existing acousto-optical devices is too large to be inserted into a $CO_2$ laser feedback cavity and still obtain reasonable laser efficiency. Consequently, CdTe electro-optical crystals are the present material of choice because these crystals have lower optical absorption in the 9.2 to 11 micron range than acousto-optical devices that presently use Ge as the acousto-optic medium. CdTe crystals have relatively poor thermal conductivity, however, and uniformly extracting the heat without imposing stress and causing birefringence is challenging. Further, non-uniform heat extraction can lead to spatial variations of the refractive index, which can produce an undesired bending or deflection of the laser beam.

Anti-reflection films are presently required to be deposited on the entrance and exiting surfaces of the CdTe crystal in order to reduce the optical loss within the laser cavity. These films have a low optical damage threshold, such that obtaining high laser reliability under high laser peak power and high laser pulse energy operation required for most material processing applications is difficult.

Other potential problems must be considered when addressing the heat removal from a CdTe crystal assembly. For example, the electrical resistance of CdTe crystals drops dramatically with increasing temperature, thus increasing the difficulty of controlling the temperature of the crystals. It is not uncommon for the electrical resistance to drop from 30 to 50 times the room temperature value when the crystal is operated above 50° C. Fortunately, if the crystal does not exceed 100°C, such as due to effective heat removal, the thermal resistance recovers when the crystal is returned to room temperature. Further, a CdTe crystal can easily suffer damage from RF arcing from any metal parts in the housing that are too close to the crystal, even when such metal parts are separated from the crystal by a dielectric because of the increased capacitive coupling caused by the dielectric constant of the dielectric.

DETAILED DESCRIPTION

Systems and methods in accordance with embodiments of the present invention can overcome various deficiencies in existing laser systems, including those described above. These embodiments can utilize an improved electro-optical (EO) modulator module including an active electro-optical crystal of a material such as CdTe. Such a module can be used for either Frequency Modulator (FM) or Amplitude Modulator (AM) mode-locking, or for Q-switching/cavity dumping, by properly orienting the CdTe crystal axis with respect to the applied electric field generated by the electrodes, and with the polarization of the laser radiation propagating down the length of the crystal as known to one of ordinary skill in the art.

In applications involving Q-switching or cavity-dumping operation, acceptable operation can be obtained with air cooling. Atmospheric air cooling can be sufficient for these operations due to the low duty cycle requirements, instead of the high or continuous duty cycle used for most mode-locking operation. If lower laser mode-locking duty cycle operation can be accommodated, air-cooling can suffice as in Q-switching or cavity dumping applications.

Figure 1:
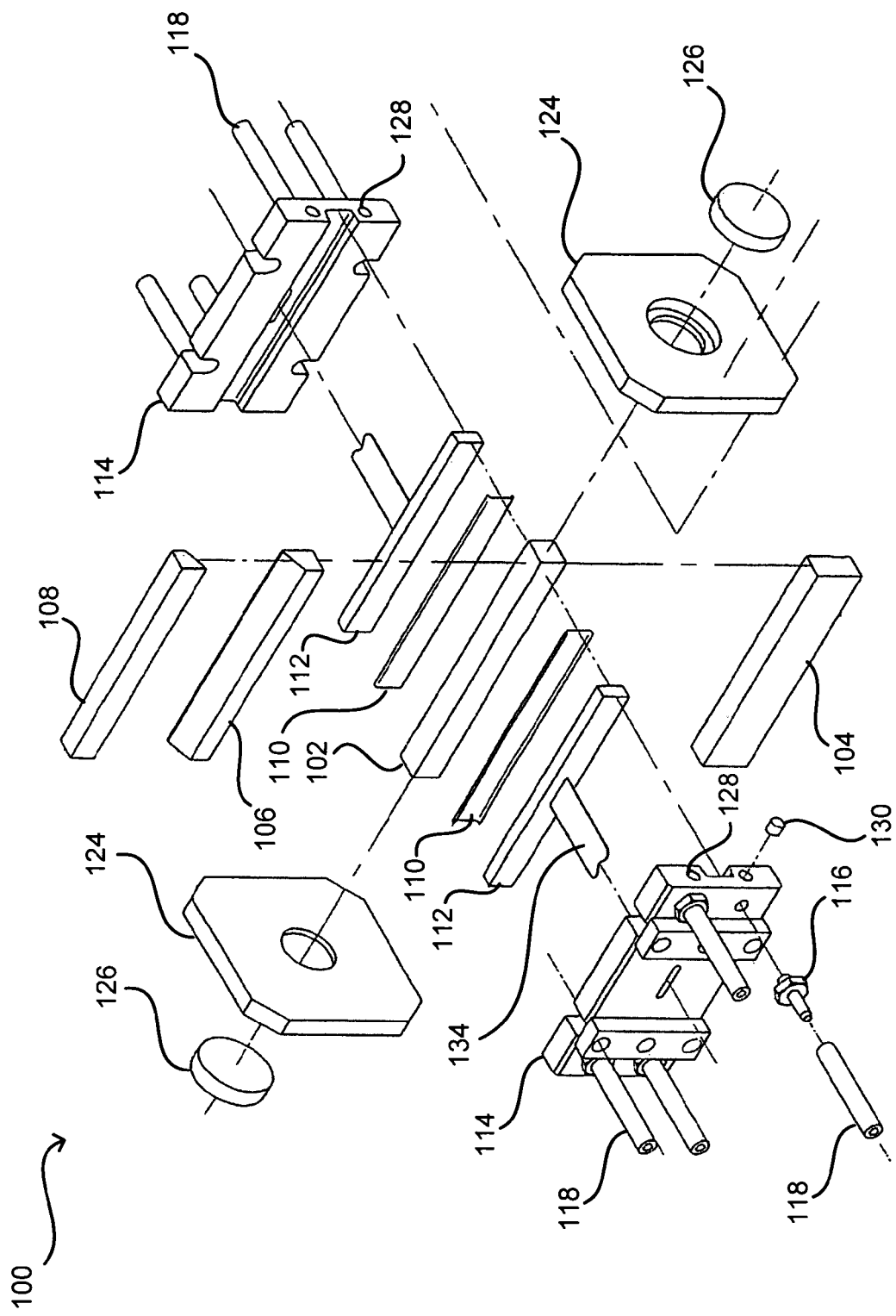
FIG. 1 is an exploded perspective view diagram of an electro-optical (EO) modulator module assembly that can be used in accordance with one embodiment of the present invention.

For many mode-locking operations, however, air cooling is not sufficient. For these operations, it is necessary to provide improved cooling and/or heat removal that does not impart undesirable stress on the crystal or produce other undesirable effects. A design that can provide such improved cooling is shown in the embodiment of FIGS. 1-4, which carry over reference numbers for simplicity. FIG. 1 shows an exploded perspective view of an exemplary EO modulator module assembly 100 that can be used in accordance with one embodiment of the present invention. These components can be contained within an appropriate modulator housing (138 in FIGS. 3-4), such as a metal housing, to provide RF shielding for mode-locking operation. A portion of a metal housing can include a plastic plate (122 in FIGS. 3-4), fabricated from a material such as Noryl®, available from Boedeker Plastics, Inc. of Shiner, Tex., a polyphenylene oxide—styrene alloy, such that any compression springs or other fastening devices passed through the plate to close the housing, as well as to apply pressure to hold the electrodes against the crystal as described below, can prevent arcing and corona discharges that can otherwise form in the module.

The module can contain an elongated, rectangular CdTe crystal 102. In order to obtain optimum performance from the crystal, it is desirable to apply no more pressure to the crystal than is necessary to hold the crystal in place. The components used to hold the crystal can be arranged to allow for a normal expansion and contraction of the crystal without causing excessive stress. To obtain optimum performance, the crystal also can be uniformly and/or symmetrically cooled, such as by a flow of liquid or gas, such that the temperature stays below about 70° C. Maintaining the temperature of the crystal can prevent a substantial change in thermal resistance. Further, minimizing temperature gradients across the crystal that would arise from uneven cooling can help to avoid significant bending and lensing of the laser beam propagating down the length of the crystal due to refractive index gradients.

The exemplary assembly of FIGS. 1-4 can be used to obtain sufficient cooling without placing undue stress on the crystal. Metal electrodes 112 can be placed on either side of the crystal 102. Soft metal cushions 110 can be placed between the crystal 102 and the electrodes 112 in order to ensure good thermal and electrical contact between the electrodes and the crystal, without placing undue stress on the crystal. The metal cushions can be made of any appropriate metal of sufficient softness and conductivity, such as for example Indium. A conductor, such as a flexible copper ribbon 134, can serve as the RF connector to the electrodes for a mode-locking modulator, or as a high video voltage connector to the electrodes for a Q-switch or cavity dumped modulator. The electrodes 112 each can be pressed against the metal cushions 110 by a dielectric wall structure 114. The dielectric wall structures can include any of a number of fastening, clamping, or holding mechanisms for applying pressure to the electrodes. In one embodiment, six screw assemblies 136 distributed symmetrically about at least one of the wall structures are used, with each screw assembly including a plastic tip embedded in holes drilled in the dielectric wall structure 114.

Figure 2:
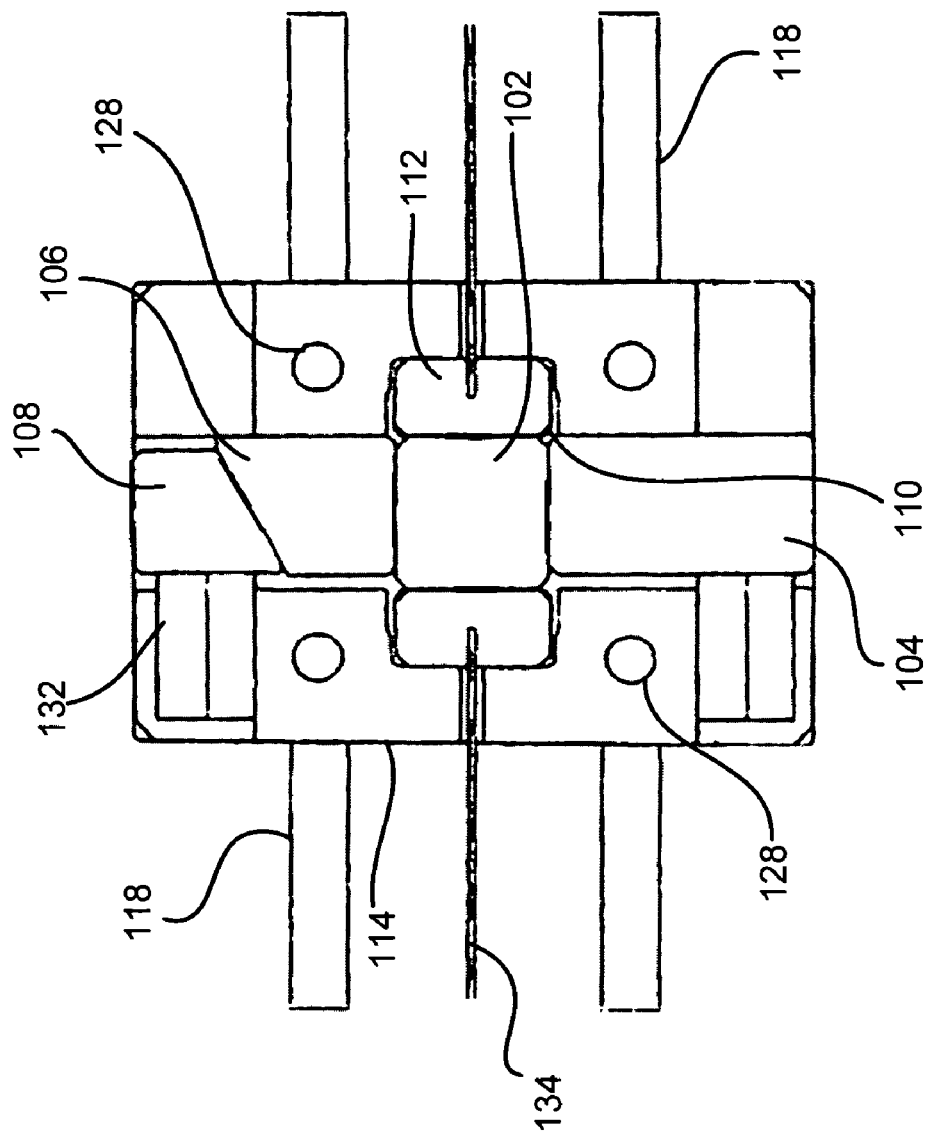
FIG. 2 is an end cross-section section view of the module assembly of FIG. 1, looking down the length of the crystal.
Figure 3:
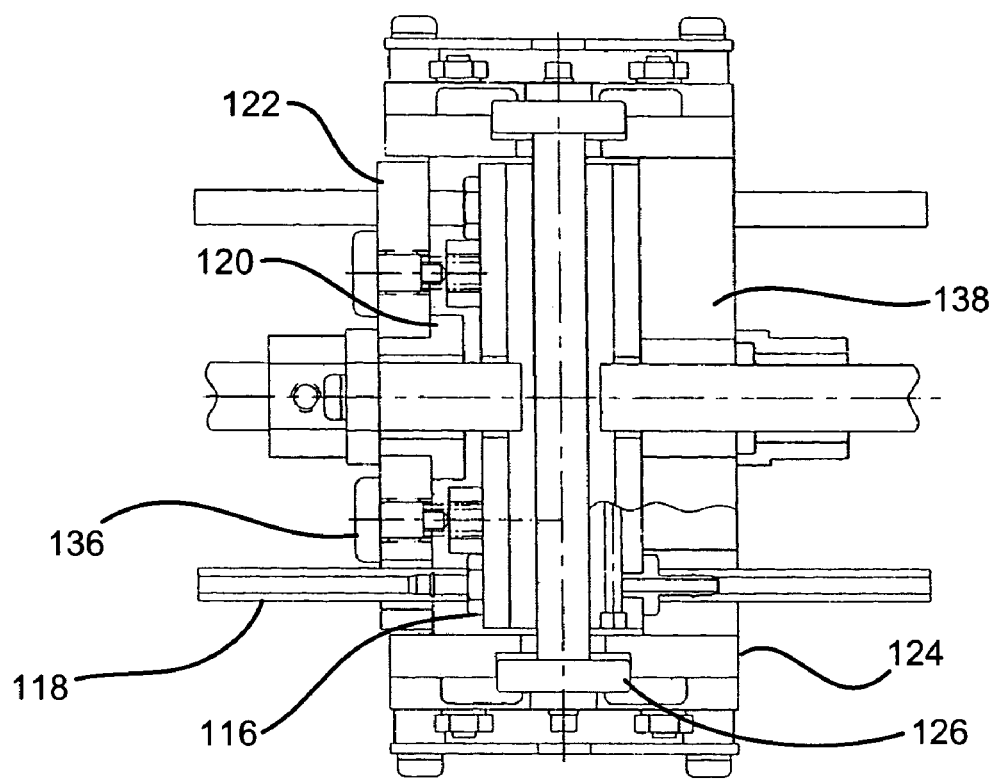
FIG. 3 is a cross-sectional view of the module assembly of FIG. 1, looking down on the module from the top in FIG. 1.

The dielectric material of the wall structures can have a good thermal conductivity and a low dielectric constant, in order to reduce the RF capacitance loading of the structure. A material that has produced favorable results as the wall structure is a Beryllium Oxide (BeO) ceramic material. Surrounding the crystal with a low dielectric constant material that lowers the capacitance coupling to ground can prevent RF and/or video arcing and subsequent damage to the EO crystal. The dielectric wall structure can be machined with a rectangular slot in the center, through which a flexible copper conductor 134 can be passed. Cooling passages 128 can be machined within the wall structures to allow liquid coolant to flow the length of the structure. The position of the passages 128 can be machined symmetrically with respect to the crystal (such as shown in FIG. 2), in order to provide for symmetric heat removal. The passages can be machined over the entire length of the wall structures for simplicity, and can be capped or plugged at each end by an appropriate plug 130, such that the cooling liquid does not leak into the module. The liquid can be directed into, and out of, the cooling passages 128 using fluid channels 118, such as channels of plastic tubing that are press-fitted onto barb fittings 116 epoxied to the dielectric wall structures 114. The coolant can flow from a coolant reservoir (not shown), through one of the channels 118, through the entrance and exit of the cooling passages 128, then back through a channel 118 to the reservoir. As shown in the Figure, there can be two parallel cooling passages in each wall structure. In order to reduce the magnitude of heat gradients across the wall structure, the coolant can be directed to flow in opposing directions in the passages (as both flowing from right to left in the Figure could result in a higher temperature at the left of the wall structure). Such liquid cooling was found to provide acceptable operation with continuous and high duty cycle RF excitation of the crystal that can be required for mode-locking the laser.

The heat removal and performance of the module can depend at least in part upon the coolant chosen to flow through the cooling passages 128. The electrical resistivity of a typical water-based coolant liquid having a corrosive inhibitor additive to prevent corrosion in Aluminum cooling coils (such as DOWFROST* HD available from the Dow Chemical Company of Midland, Mich.) can be too low for use in an RF modulator module. The low RF resistance of such coolants can lead to undesirable heating of the coolant, and a subsequent heating of the modulator module itself. The low RF resistance also can make it difficult to obtain the high RF voltage needed to obtain good mode locking performance. In one embodiment, a preferable coolant was found to include a mixture of 10% corrosion inhibitor such as Optishield® II, sold by OptiTemp of Traverse City, Mich., and approximately 90% de-ionized water. This mixture satisfies the requirements for corrosion prevention, cooling, and high RF resistance. In a system without an aluminum cooling coil, such as a system that utilizes copper for the cooling system, de-ionized water can be an acceptable solution as corrosion will be prevented and a high RF resistance maintained.

Figure 4:
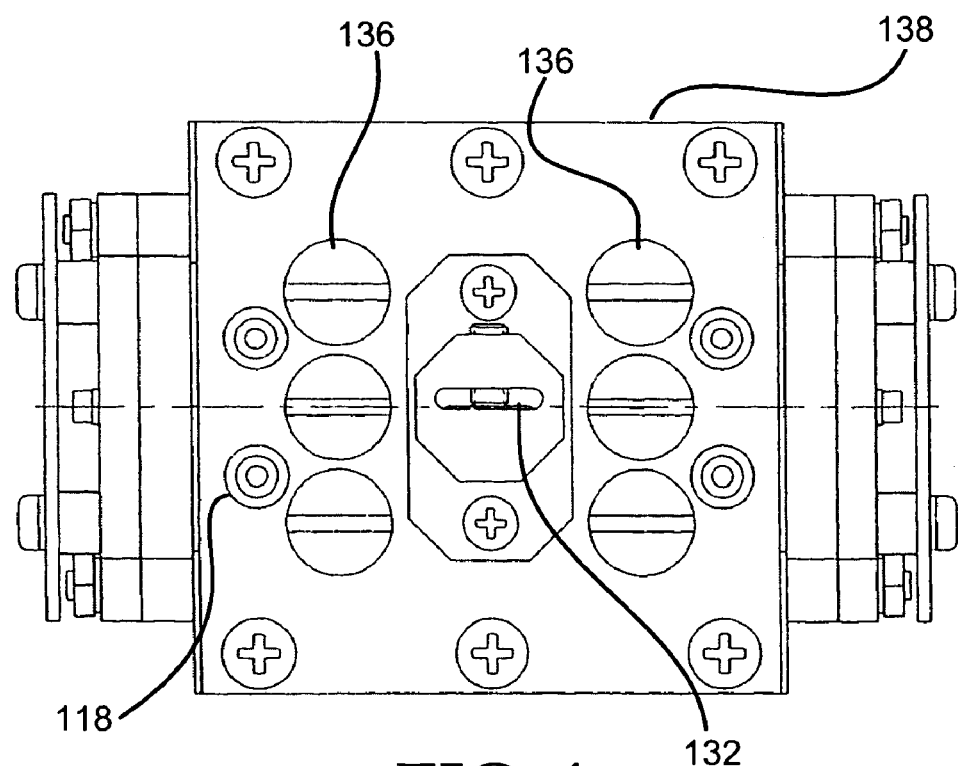
FIG. 4 is an external side view of the EO module assembly of FIG. 1.

In order to provide support orthogonal to that of the electrodes 112, a pair of ceramic holders 104, 106 can be used to contact the sides of the crystal 102 that are not contacted by the soft cushions 110. These ceramic holders can be made of any appropriate thermally conducting material, such as a BeO ceramic, and can be machined for uniform contact between the holders and the EO crystal 102, thereby obtaining good thermal conductivity from the crystal to at least one of the wall structures 114 in contact with the holders. At least one of the ceramic holders can include a lower holder 106 in combination with an upper wedge portion 108. As shown in the end view cross-section of FIG. 2, the top-view cross-section of FIG. 3, and the side view of FIG. 4 showing the assembled module components in the module housing 138, screw assemblies 136 can be used with wall structure 114 to move a sliding member 132 such as a plastic end cap, such that the end cap presses against the BeO wedge 108. Tightening the screw assembly pushes the end cap against wedge 108, which then is forced to slide (to the right in the Figure) on the lower BeO wedge 106. This arrangement provides an adjustable downward force on the EO crystal 102, while also providing a good conductive cooling path for the EO crystal. An adjustable amount of downward force between about 2 lbs. and about 10 lbs. has been found to serve the purpose of holding the crystal in one embodiment, while providing the required thermal conduction and pressure adjustment to obtain uniform stress on the crystal. Such an assembly also allows all of the pressure adjustment screw assemblies to be positioned along one of the wall structures 114, simplifying both operation and design. For example, additional screw assemblies can be passed through the wall structure to apply pressure to metal electrode 112 in order to ensure good and uniform thermal and electrical contact with the crystal, as well as to press against the BeO ceramic holder 104 upon which the CdTe crystal 102 rests. The surfaces of the BeO ceramic holders 104, 106 and the sliding surfaces between BeO parts 108 and 106 can be fine machined for substantially uniform contact, as well as to place substantially uniform pressure on the EO crystal 102 while holding the crystal in place. The uniform contact also helps to obtain good thermal conductivity from the crystal 102 to the BeO wall structure 114. The screw assemblies can be adjusted such that a minimum sufficient and/or uniform stress is placed on the EO crystal. The screw assemblies can be adjusted manually or using mechanical means, such as in combination with a feedback loop, in order to apply an even and sufficient amount of pressure. Applying a minimum and uniform amount of pressure to the crystal on each of the four sides of the elongated rectangular crystal can help to minimize birefringence and bending of the laser beam, as well as to obtain good thermal contact such that heat flows evenly from the crystal.

As shown in FIG. 1, the module assembly can include window holders 124 on each end of the assembly. These window holders in one embodiment are polyetherimide plastic parts, which are 30% glass filled. Glass-filled polyetherimide has a relatively high strength that allows the material to easily be cut to form, in order to properly to support the windows, while also not being electrically conductive. The glass filling also allows threads to be machined into the window holders such that bolts or screw assemblies can be used to connect the window holders to the housing 138. Each window holder 124 can hold a window 126 for the module, with each window being held against an end of the crystal 102. These windows can be made of any appropriate material, but in one embodiment comprise zinc selenide (ZnSe) windows. As explained in U.S. Pat. No. 5,680,412, issued on Oct. 21, 1997 and hereby incorporated herein by reference, ZnSe windows can improve the optical damage threshold of a CdTe crystal. The ZnSe window holders 124 in such an embodiment can be fabricated from a plastic dielectric such as Ultem 2300. Another window holder, or a panel or other mechanism (not shown) can be used to hold the window against each window holder 124. The openings in the window holders through which the laser beam passes can be larger than the beam diameter, in order to avoid burning the edges of the opening. If an outer window holder is used, cross-cuts can be used to provide a flexible spring-like and firm force to hold the windows against the end of the EO crystal.

In the embodiment shown in FIGS. 1-4, superior cooling of the EO crystal can be obtained by passing heat through the copper electrodes 112 to the two BeO wall structures 114, which include the cooling passages 128 allowing most of the heat to be carried away by the coolant. Thermal cooling of the EO crystal also occurs through the top and bottom surfaces of the EO crystal by thermal conduction through the BeO sliding pieces 106, 108 and the stationary piece 104 into the BeO wall structure against which the pieces are being pressed, such that the heat also can be taken away by the flowing coolant. This symmetric cooling of the EO crystal can result in minimum distortion of the transiting laser beam due to deflection or lensing effects caused by refractive index variations arising during the warm-up/cooling transients.

Heat also can be transmitted to the metal housing 138 from BeO pieces 104 and 108, as well as from the wall structures 114. Sufficient cooling without fluid flow can be obtained for those applications where the duty cycle is low and, consequently, there is less heat removal required. Some small beam distortion can occur during the warm up time of the module since the cooling in vertical and horizontal axes of the crystal, for example, is not uniform without liquid cooling. The laser resonator can be re-adjusted after the module has reached thermal steady state condition in order to compensate for the distortion.

Such a modulator module can be used with either FM or AM modulation to mode lock a laser by properly orienting the crystal axis. Axis orientation is well known in the art, such as described, for example, in the reference by A. Yariv, *Quantum Electronics*, $3^{rd}$ edition: John Wiley & Sons, 1985. It also is well known that FM mode-locking requires less voltage than AM modulation and is therefore preferred for many applications, such as is shown in the reference by D. J. Kuizenga and A. E. Siegman, "*FM and AM Mode-Locking of the Homogeneous Laser-Part I Theory,*" IEEE J. Quant. Electron; QE-6, November 1970, p. 694. For Q-switching $CO_2$ lasers, the CdTe crystal axes with respect to the polarization of the laser can be arranged as for AM mode locking in the modulator module design of FIGS. 1-4. It also is well known that shorter mode-locked $CO_2$ laser pulses can be obtain by increasing the pressure of the gas mixture within the laser head, thereby increasing the laser gain bandwidth. See for example the reference by Knut Stenersen, Stig Landro, Per Inge Jensen, and Stian Lovold, "*FM Mode*

Locked High Pressure CW RF Excited $CO_2$ Waveguide Laser," IEEE J. of Quant. Elect., Vol. 27, No. 7, July 1991 pp. 1869-1873.

Figure 5A:
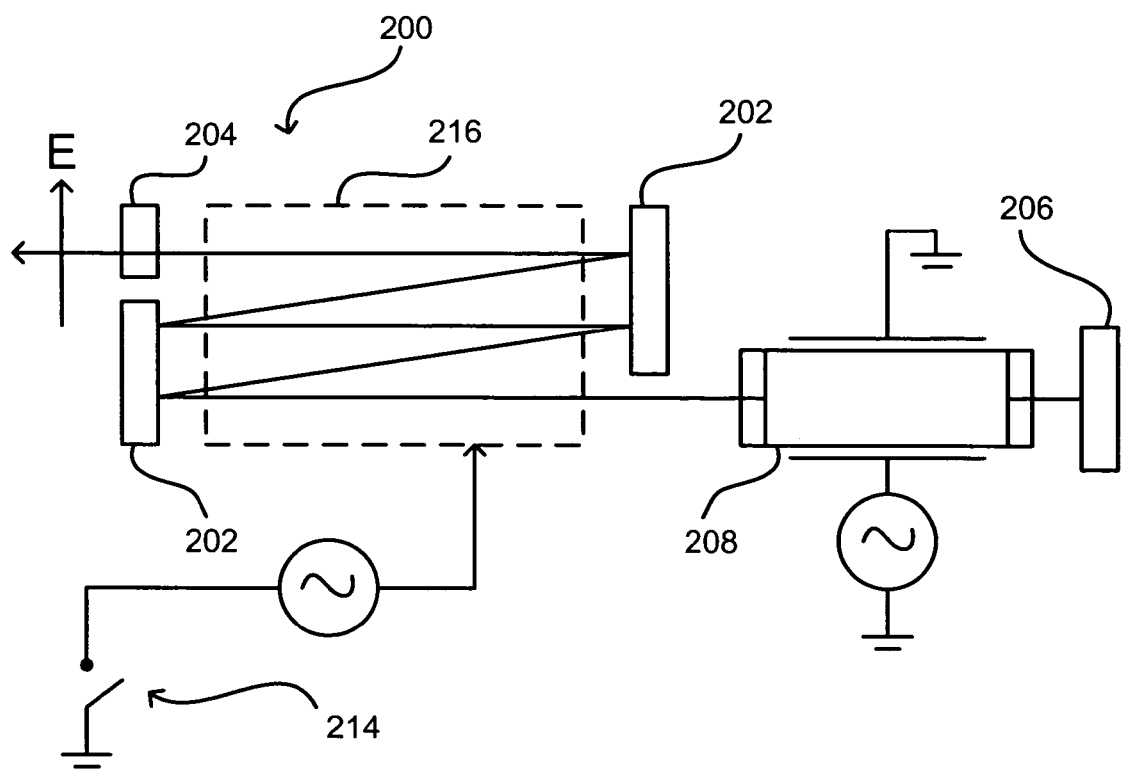
FIG. 5 is a schematic diagram showing a folded waveguide laser system that can be used with the module assembly of FIG. 1.
Figure 5B:
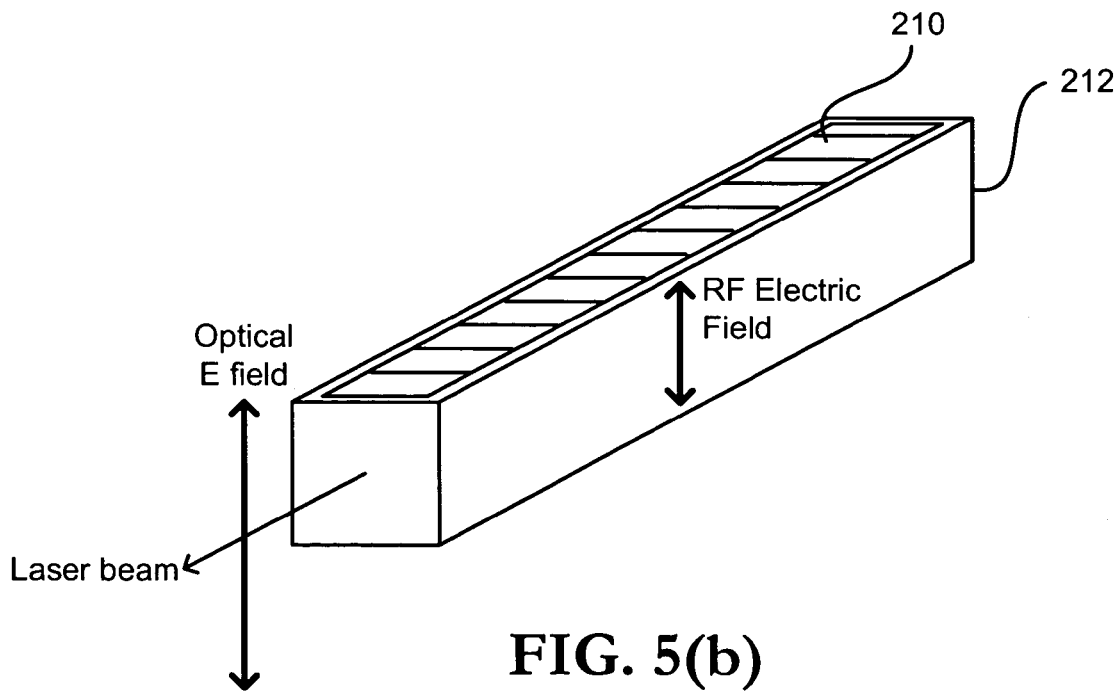

It can be advantageous for many applications to keep the pulse repetition rate of a mode-locked laser relatively low. Unfortunately, a low mode-locked pulse repetition frequency can necessitate a longer laser resonant cavity, which can increase the difficulty in aligning, and maintaining the alignment of, the Fabry-Perot cavity. Fortunately, a folded "saw-tooth" waveguide laser design can be used as shown in FIG. 5(a). Examples of waveguide laser designs are described in U.S. Pat. No. 6,192,061 B1, issued Feb. 20, 2001, entitled "RF Excited Waveguide Laser;" and U.S. Pat. No. 6,697,408 B2, issued Feb. 24, 2004, entitled "Q-switched Cavity Dumped $CO_2$ Laser for Material Processing," each of which are hereby incorporated herein by reference. Such a design can provide a compact, relatively low pulse repetition frequency mode-locked $CO_2$ laser package with reasonable average power output that is suitable for industrial/scientific applications. For example, a 5-folded, square bore waveguide 200 as shown in FIG. 5(a) can be configured with near 100% reflectance mirrors 202 to set the direction and length of each pass through the waveguide. The total cavity length is approximately 265 cm in an embodiment where each pass though the waveguide is approximately 53 cm in length. A partially reflecting output mirror, with a reflectance on the order of about 70%, can be used at the output of the waveguide. Another near 100% reflectance window 206 can be placed on the other side of the modulator module 208, in order to serve as a resonator mirror for the beam path through the crystal. The orientation of the crystal in the modulator module in FIG. 5(a) is shown in FIG. 5(b), with the electrodes 210 placed at the top and bottom of the crystal 212 in the Figure, so as to apply a vertical electric field across the crystal. The crystal in this embodiment is 5 mm by 5 mm in cross section, and about 50 mm in length. Such a design can yield a mode-locked pulse repetition frequency of approximately 56.6 MHz, with pulse widths of approximately 3.2 nanoseconds at an operating pressure of around 100 Torr with approximately 23 W of output power. A switch 214 can be used with the waveguide in order to super-pulse the laser discharge, such as by using about a 100 MHz discharge drive voltage and electrodes on either side of the waveguide. FM modulation was used with the EO modulator module in experiments to obtain these results, with the RF drive power to the laser discharge being pulsed at approximately ½ the duty cycle of the continuous wave power.

Figure 6:
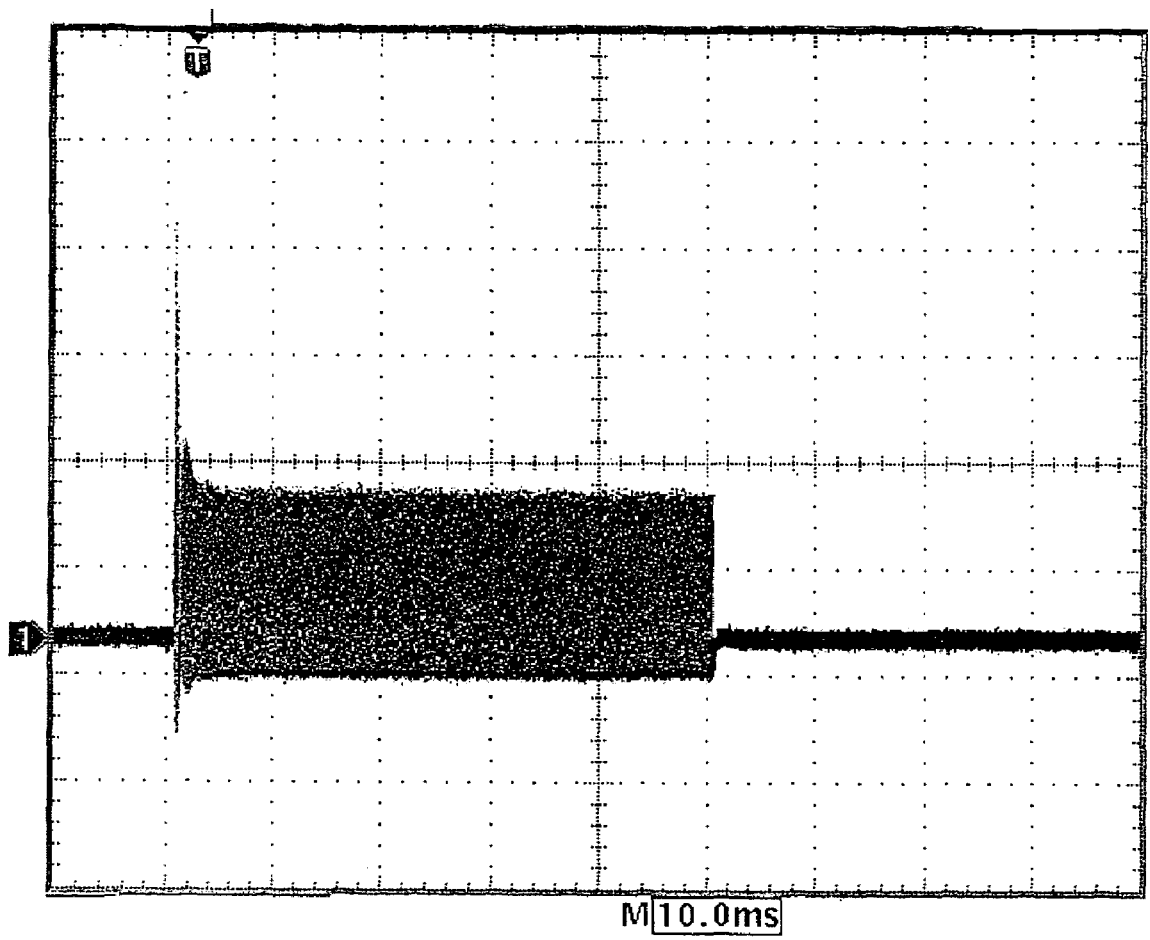
FIG. 6 is a plot showing the operation of a FM mode-locked $CO_2$ laser as per the configuration of FIG. 5 with the pulsed RF power applied to the discharge of the $CO_2$ laser.
Figure 7:
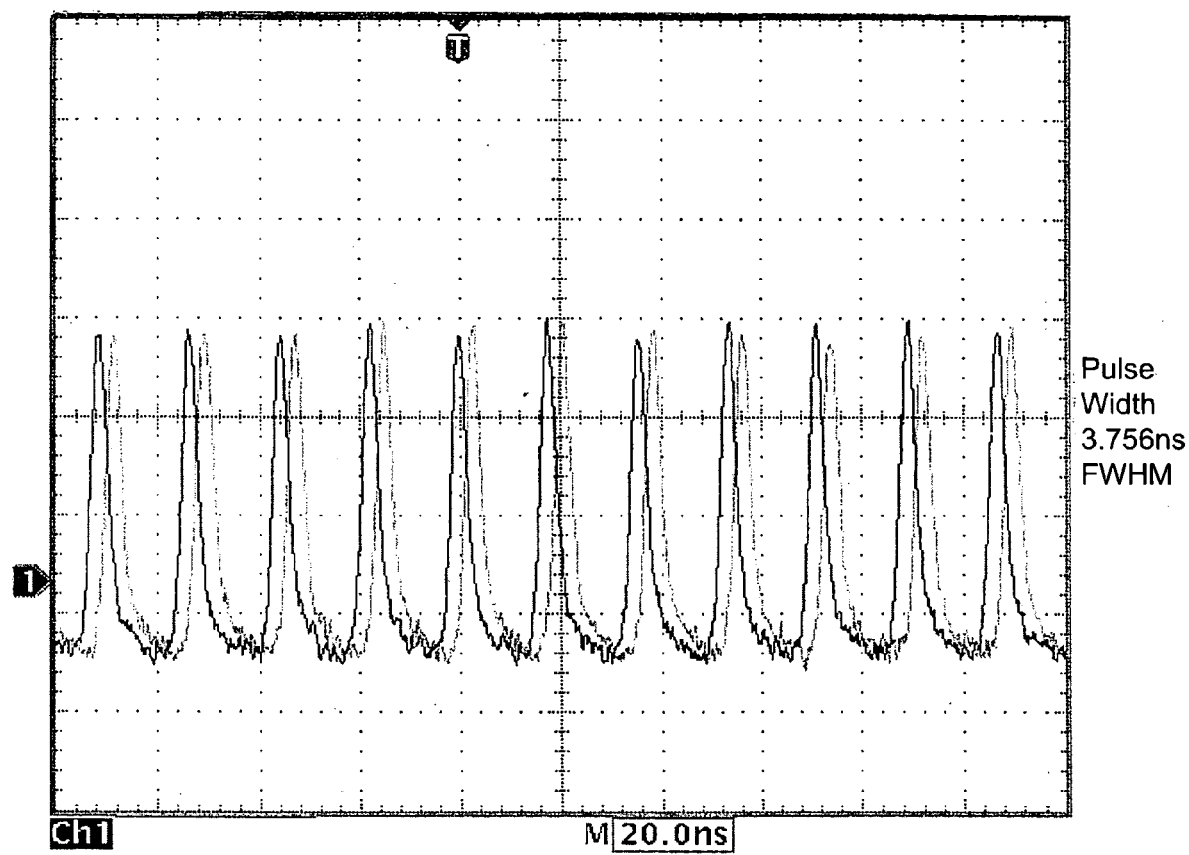
FIG. 7 is plot showing the individual $CO_2$ laser mode-locked pulses of FIG. 6.

FIG. 6 illustrates the operation of a FM mode-locked $CO_2$ laser as per the configuration of FIG. 5(a) with the pulsed RF power applied to the discharge of the $CO_2$ laser. The oscilloscope trace has a sweep speed of 10 msec per major division, for a burst of mode-locked pulses lasting 50 μsec. At the beginning of the laser oscillations, the laser output radiation was gain switched and a series of higher peak power mode-locked pulse were initiated having a peak power of approximately 4.0 times the average power of the steady state mode-locked pulses within the RF discharge excitation time. FIG. 7 illustrates the individual $CO_2$ laser mode-locked pulses at an oscilloscope sweep speed of 20 nsec per major division. The full-width, half-maximum pulse widths shown are at 3.76 nsec. The gas pressure was approximately 100 Torr and the time separation between pulses was approximately 17.8 nsec for the mode-locked laser pulses. The crystal orientation for the FM modulator was as illustrated in FIG. 5(b). The crystal orientation for Q-switching and cavity dumping operation and the experimental laser arrangement with the EO module of FIG. 1, inserted within the $CO_2$ laser, can be as described in U.S. Pat. No. 6,697,408, incorporated by reference above.

The design of the modulator module illustrated by FIGS. 1-4 can be used successfully for high duty cycle mode-locking operations, but can be more complex and costly to manufacture than may be needed for other operations, such as for most Q-switching and/or cavity dumping operations. For these lower duty cycle operations, there typically will be less heating of the EO crystal. A simpler EO module design therefore can be suitable for such operations, which maintains most of the advantages of the water-cooled embodiment described with respect to FIGS. 1-4.

Figure 8:
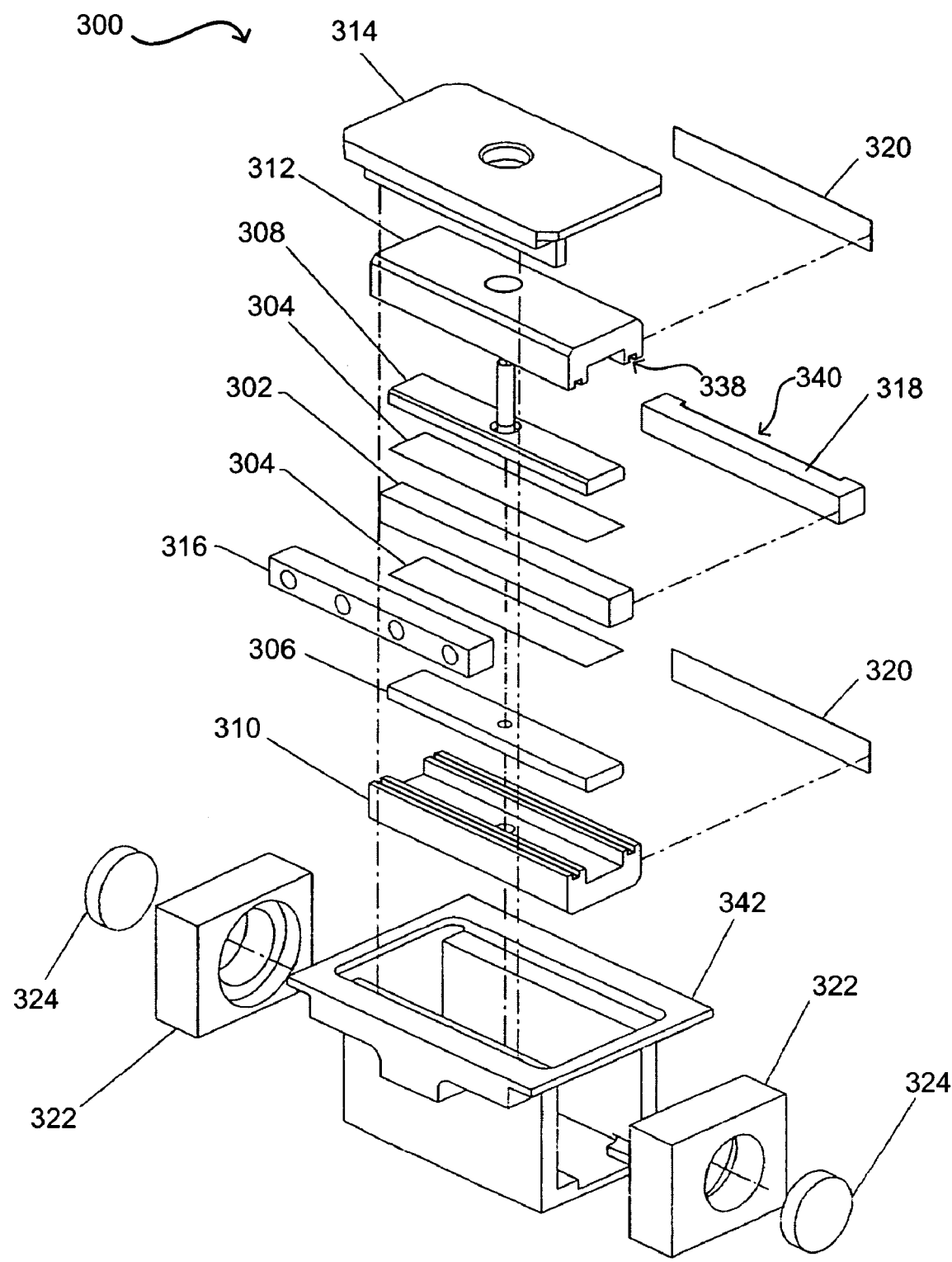
FIG. 8 is an exploded perspective view diagram of an electro-optical (EO) modulator module assembly that can be used in accordance with a second embodiment of the present invention.
Figure 9A:
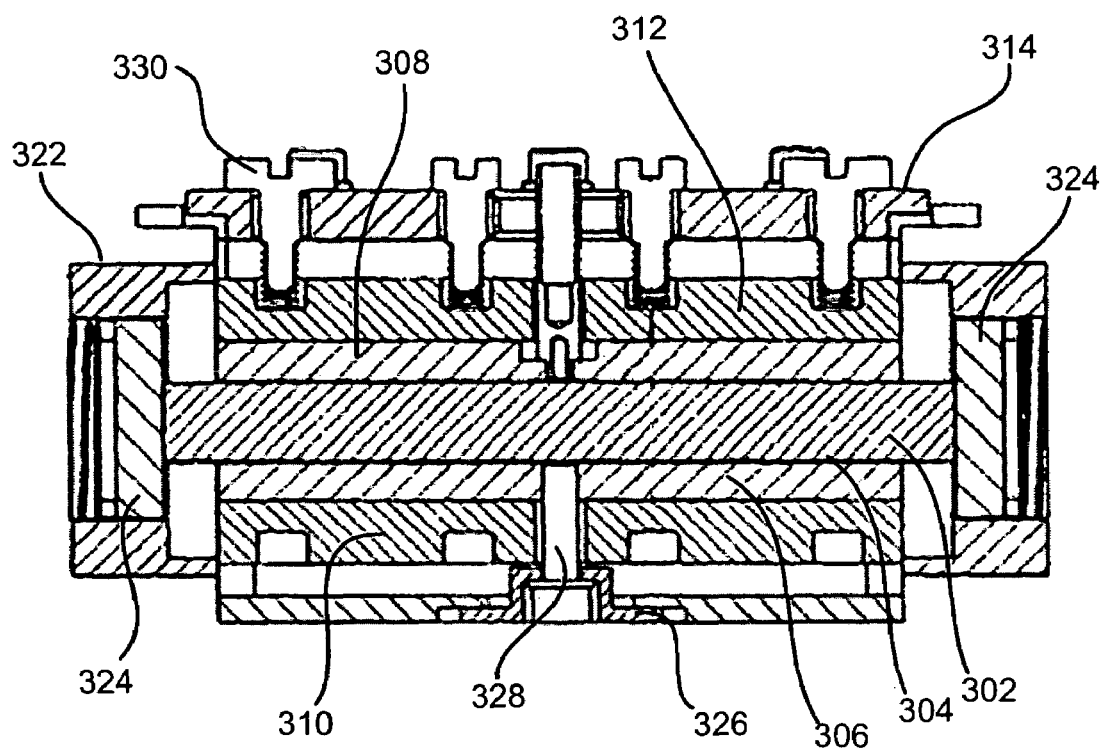
FIG. 9 is (a) a side cross-sectional view, (b) a first end cross-sectional view, and (c) a second end cross-sectional view of the module assembly of FIG. 8.
Figure 9B:
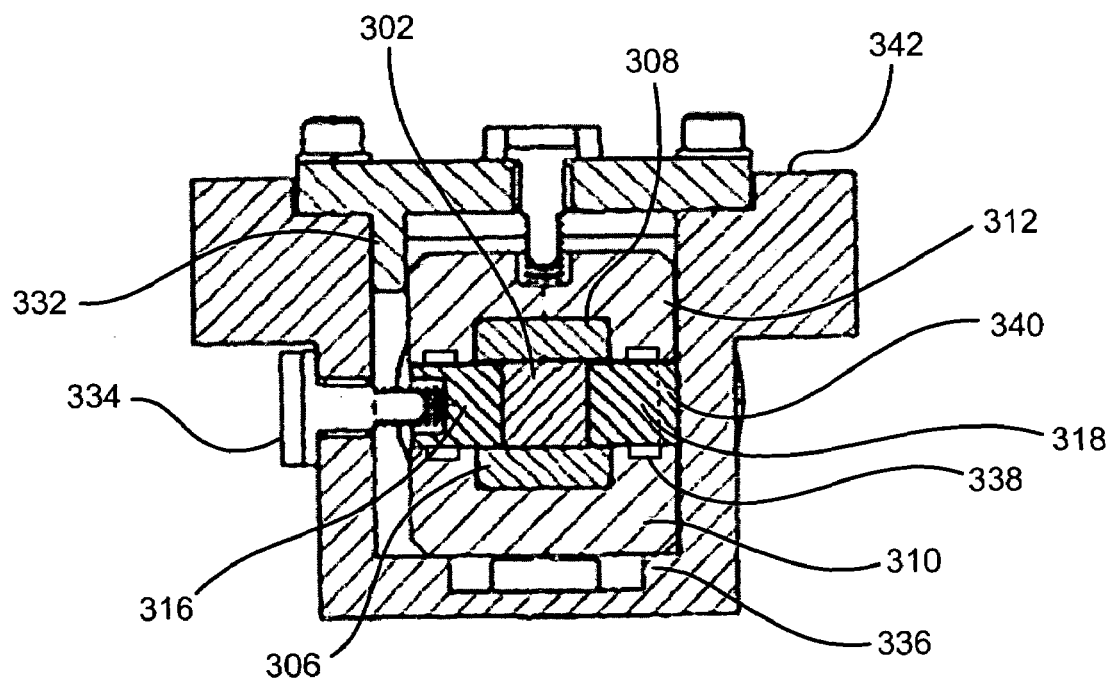
Figure 9C:
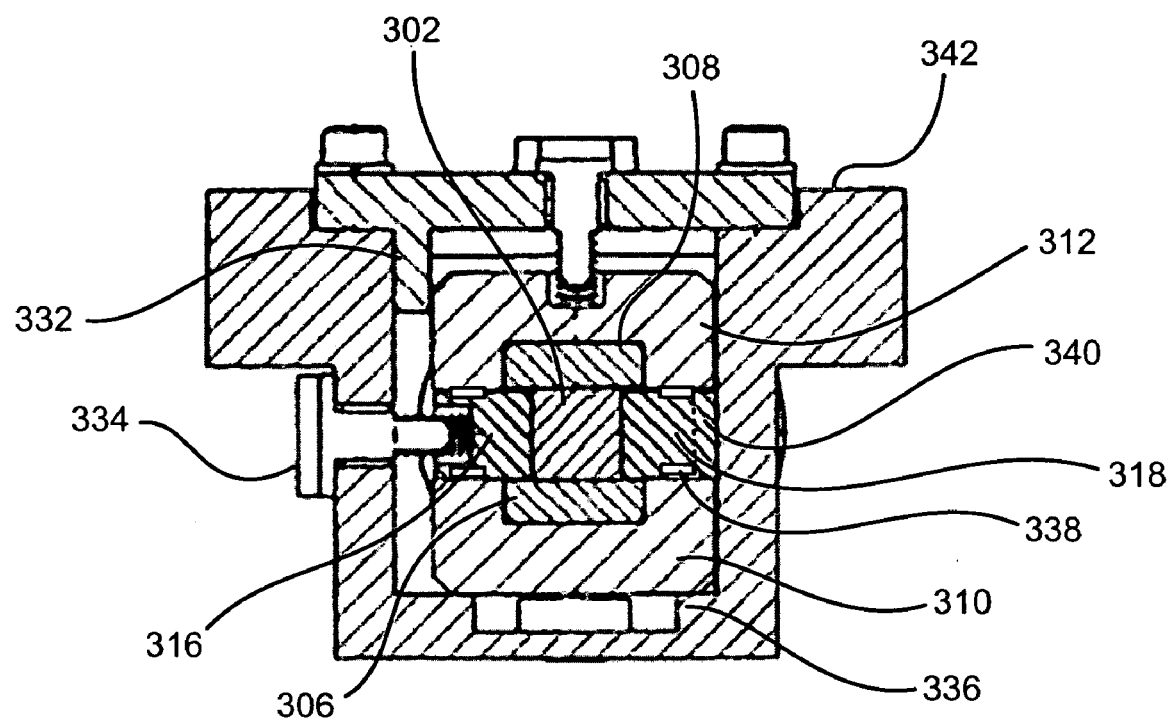

An embodiment using a simplified design of an EO modulator module 300 is illustrated by the exploded perspective view of FIG. 8, as well as the cross-sectional side view of FIG. 9(a) and the cross-sectional end views of FIGS. 9(b) and 9(c). In these Figures, a housing 342 is shown, such as an aluminum housing, into which fits a lower dielectric holding structure 310, such as a BeO holding structure, shaped to hold a lower electrode 306, such as a copper electrode. A soft cushion 304, such as an Indium cushion described with respect to FIG. 1, can be placed on the electrode to gently support the electro-optical crystal 302 as shown in FIG. 9(b), which can be an elongated rectangular CdTe EO crystal as described with respect to FIG. 1. Another soft cushion 304 and electrically "hot" copper electrode 308 can rest upon the top of the EO crystal 302, fitting into a recessed area of a top dielectric holding structure 312. The Indium cushions 304 again can be used to substantially uniformly and firmly hold the EO crystal 302, without causing undue stress on the crystal. BeO again can be chosen for the structural components due to the exceptional thermal conductivity of BeO, which is approximately an order of magnitude higher than that of an Alumina ceramic, as well as the relatively low dielectric constant of BeO, which is approximately ⅓ lower than for an Alumina ceramic. It should be recognized that various other materials with similar properties can be substituted for BeO in fabricating items such as a holding structure 310, 312 in this simplified embodiment.

An electrical connection from the "hot" top electrode 308 to a voltage source (not shown) such as a high video voltage pulse source can be obtained through use of a copper wire soldered to the hot electrode 308 and passed through a top metal plate 314 by an electrical insulating fitting, such as is shown in the top center of FIG. 9(a). A connection to the bottom "ground" electrode 306 can be obtained through use of a screw assembly 328 threaded into the ground electrode 306. The screw assembly can be adjusted to ensure a good electrical ground to the metal housing 342. A metal flange 326 also can be used to improve the ground connection. As in FIG. 1, window housings 322 can be used to hold the windows 324 tight against the EO crystal 302.

Since this modulator design does not utilize liquid cooling, the primary path for heat removal is through the Indium cushions 304 and copper electrodes 306, 308 into the BeO holding structures 310, 312, through the right side of each BeO holding structure 310, 312 as shown in FIG. 9(b) and into the right side of metal housing 342. The heat then can be conducted into a chill plate, for example, used by the Q-switched laser. The housing can include any element(s) known to improve heat dissipation, such as metal fins for increasing the external surface area of the housing. A spring-loaded screw assembly 334, used to press the crystal-holding components against the housing in order to assure good thermal contact, can prevent the components from contacting the left side of the housing in the Figure. It should be understood that other design choices are possible, such as a tight-fitting housing or inclusion of additional shims or cushions, whereby these components contact both sides of the housing for additional heat removal. Since the top of the upper holding structure 312 is not in contact with the metal cover 314 due to an air space imposed by the top screw assemblies 330, the bottom of the lower BeO holding structure 310 can be designed to not be in complete contact with the bottom of the metal housing 342, thereby reducing the area through which heat can flow from the bottom of BeO holding structure 310. This provides for substantially equal heat extraction from each of the two surfaces. The edges of the bottom of the holding structure 310 can be pressed against the small surface area of the small raised lips 336 along the two inside bottom edges of the metal housing 342, as shown in FIG. 9(b). This allows a small but equal amount of heat to be removed from the top and bottom ceramic holding structures 310, 312.

A small amount of heat also can be removed by the small contact area of a side BeO holding structure 316 used to apply pressure to a side of the EO crystal, as shown on the left side of FIG. 9(b) applied from the left-hand side of the metal housing 342. As can be seen, screw assemblies can be used to apply pressure to the holding structure 316 to push the EO crystal to the right in the figure. The EO crystal then presses against another side holding structure 318, which in turn is pressed against the wall of the Aluminum housing 342. To reduce the flow of heat from the right (in the figure) side BeO structure 318, so as to match the heat flow from the left side BeO structure 316, the surface contact area between the housing 342 and the right structure 318 can be reduced to equal the contact area between the side screw assemblies and the holding structure 316, such as by using a notch 340 or groove machined in side element 318 as shown in FIG. 8 (and designated by the dotted line area in FIG. 9(b)). An alternate approach would be to insert metal shims to adjust the amount of contact area in place of a notch or groove in element 318. A slight depression trench or lip 338 can be machined near the edges of the upper and lower holding structures 310, 312 as shown in FIGS. 8 and 9(b), thereby reducing the heat flow from the right structure 318 into the housing 342 to match the heat flow into the housing 342 (through the upper and lower holding structures) from the left side structure 316. An alternate approach can be used to reduce the amount of heat flow from the upper and lower surfaces of the side holding structures 316, 318 into the lower and upper BeO holding structures 310, 312, such as by manufacturing notches 338 in the side structures 316, 318 as shown in FIG. 9(c) instead of in the upper and lower holding structures as shown in FIG. 9(b). Either approach can limit the contact area between these components, thereby reducing the amount of heat flow. Since this design uses top, bottom, and side holding structures to surround the crystal with a low dielectric constant material, the capacitance coupling to ground again will be lowered such that high video voltage arcing, as well as subsequent damage to the EO crystal, can be prevented.

A metal cover plate 314 can be bolted or otherwise attached to the housing 342. Screw assemblies, which also can have associated metal springs, can pass through the metal cover plate to uniformly push down on the top BeO holding structure 312. A thin rib member 332 can extend from the bottom of the cover plate 314, as shown in FIGS. 8 and 9(b), which functions to push the upper BeO holding structure 312 to the right in FIG. 9(b) and against the metal housing 342 when the cover is in place.

The thermal design of FIGS. 8-9 provides a sufficient and substantially uniform amount of cooling from the top and bottom of the EO crystal 302, through the copper electrodes 306, 308 into the BeO holding structures 310, 312 and into the metal housing 342. Due to the screws 334 and the empty space between the housing 342 and internal components 312, 310, 316, the thermal design can provide for a smaller but equal amount of cooling from both sides of the EO crystal 302 into the metal housing 342. Since the cooling from the sides is somewhat lower in this embodiment, the EO crystal 302 can experience a small refractive index variation in the vertical direction, which can lead to a cylindrical lens effect in the vertical direction of FIG. 9(b) or FIG. 9(c), since the center of the crystal is hotter than the ends. More importantly, however, this cooling approach maintains constant cooling along the horizontal axis, thereby minimizing minimize the refractive index variation along the horizontal direction of the crystal due to the small but equal amount of heat that flows horizontally in the Figure. The maintaining of a substantially constant temperature along the horizontal axis of the EO crystal can result in a lack of a temperature gradient such that there is little to no radiation deflection in the horizontal direction. The small lens effect experienced in the vertical direction can be tolerated by a Q-switched laser, and typically will not appreciably alter performance. On the other hand, the little to no radiation deflection existing in this Q-switched modulator design greatly improves the performance of a Q-switched $CO_2$ waveguide laser beam.

Figure 10:
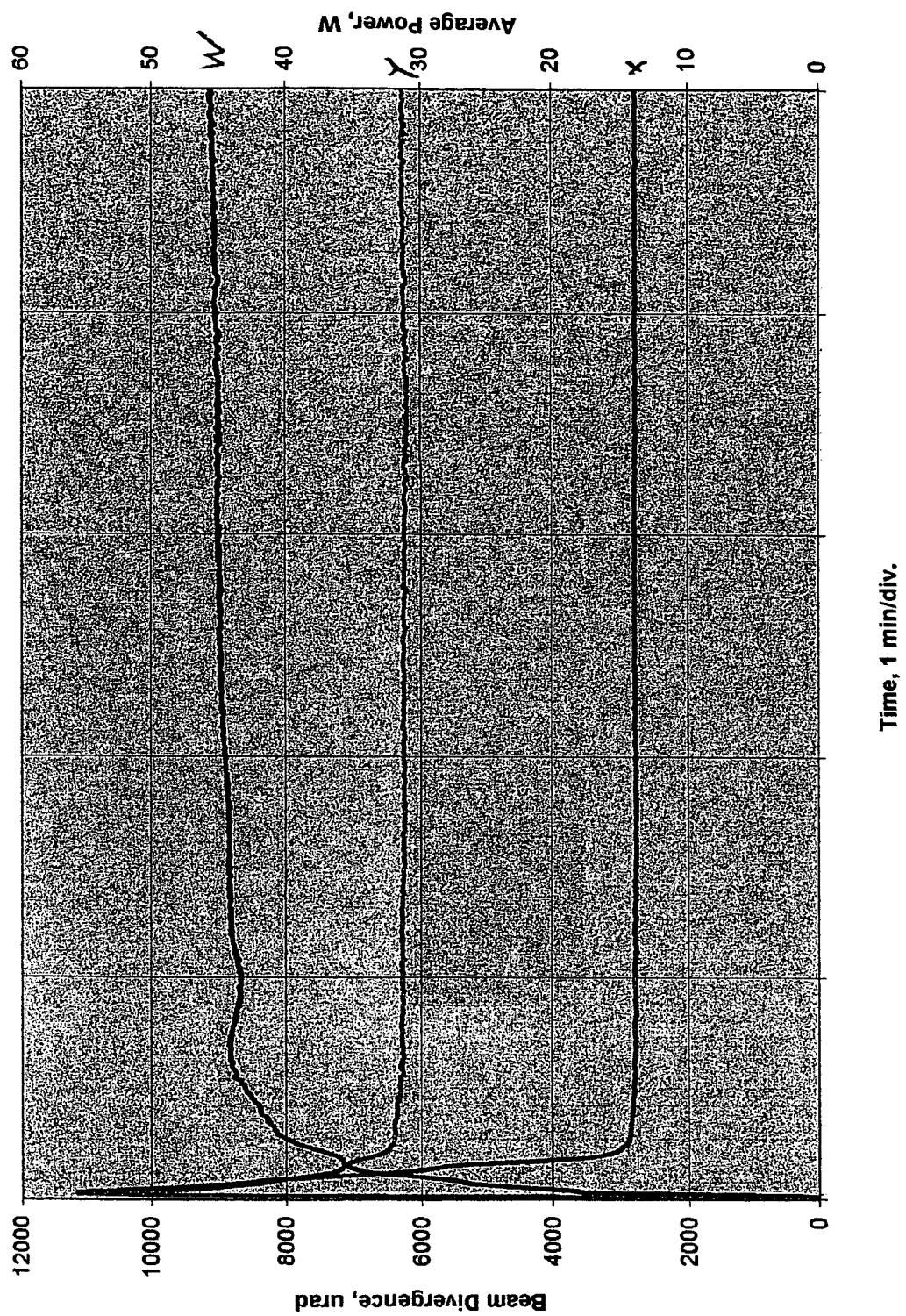
FIG. 10 is a plot showing the power output of a Q-switched waveguide $CO_2$ laser as a function of time, utilizing a modulator design of the prior art.

FIG. 10 illustrates as a function of time, with 1 minute per division, the power output of a Q-switched waveguide $CO_2$ laser utilizing a modulator design of the prior art. The laser used to gather the data of FIG. 10 utilized a modulator design as shown and described with respect to FIGS. 20 and 21 in U.S. Pat. No. 6,697,408 B2, incorporated by reference above, which includes both beam deflection and lensing conditions. The power reached a steady state value of approximately 46 W after approximately 2 minutes of warm-up time. FIG. 10 also illustrates as a function of time the far field output beam divergence variations, in microradians, along both the vertical (Y) and horizontal (X) axes. It can be seen that quickly after the start, the output beam divergence in both the X and Y axes raises to greater than 10,000 microradians. In approximately 0.2 minutes the beam divergence drops to approximately 6,300 μrad for the vertical (Y) and 3,400 μrad for the horizontal (X) axis. The difference of approximately two times between the divergence of the horizontal and vertical beam directions is due to the fact that the waveguide channel is rectangular in shape with the vertical height (0.11 inches) being ½ of the horizontal width (0.22 inches).

Figure 11:
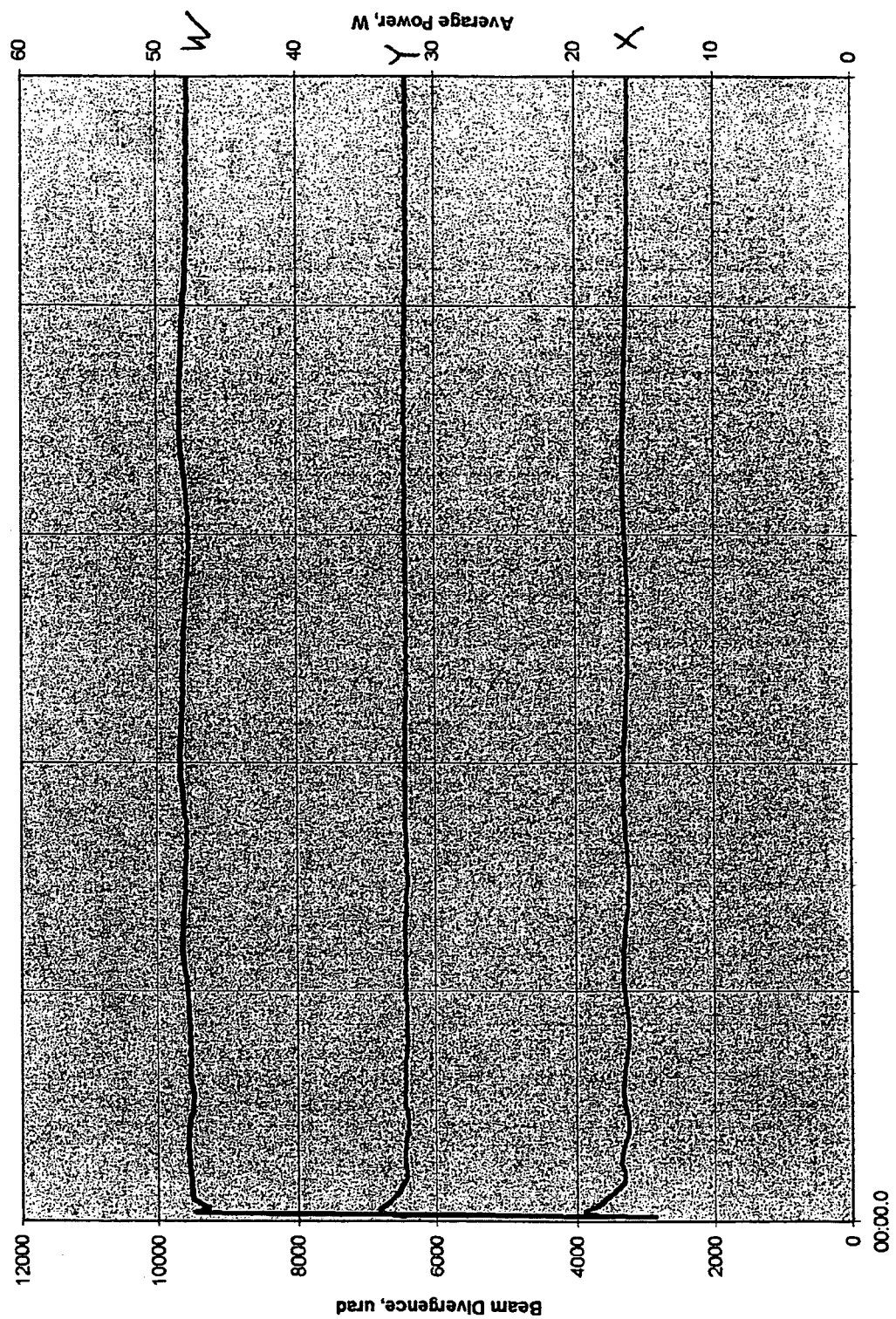
FIG. 11 is a plot showing the power output of laser of FIG. 10, utilizing a modulator design as in FIGS. 8-9.

FIG. 11 illustrates the behavior of the same laser with a Q-switching modulator module using a design as described with respect to FIGS. 8-9. It can be seen that the power output rises to the steady state power of approximately 48 W in about 0.1 minute or less. This corresponds to an improvement of about 20 times over the prior art modulator design. It also can be seen that the far field beam divergence raises to 6,880 μrad and 3,900 μrad for the Y and X axes, respectively. The far field beam divergence then drops to the steady state value in approximately 0.2 minute. Clearly, the beam divergence results of FIG. 11 are superior to the results of FIG. 10.

It should be recognized that a number of variations of the above-identified embodiments will be obvious to one of ordinary skill in the art in view of the foregoing description.

Accordingly, the invention is not to be limited by those specific embodiments and methods of the present invention shown and described herein. Rather, the scope of the invention is to be defined by the following claims and their equivalents.

What is claimed is:

1. A method of symmetrically cooling an active optical crystal in a modulator module of a $CO_2$ laser system, comprising the steps of:
   positioning a pair of wall structures on opposing sides of the active optical crystal such that the wall structures are in thermal contact with the optical crystal, each wall structure having at least two parallel cooling passage in thermal contact therewith, the parallel cooling passages positioned symmetrically with respect to the active optical crystal; and
   directing a flow of fluid through each cooling passage in opposing directions in order to remove heat transferred from the active optical crystal.

2. A method according to claim 1, further comprising:
   forming each of the pair of wall structures of a low dielectric constant material capable of preventing arcing across the active optical crystal.

3. A method according to claim 1, further comprising:
   positioning a pair of electrodes on opposing sides of the active optical crystal such that each of the pair of wall structures presses one of the pair of electrodes against a respective side of the crystal, the pair of electrodes capable of applying an electric field across the active optical crystal and passing heat from the active optical crystal to the wall structures.

4. A method according to claim 3, further comprising:
   positioning a metal cushion between each of the pair of the electrodes and the active optical crystal, each metal cushion capable of ensuring thermal and electrical contact between the electrodes and the crystal without placing undue stress on the crystal, each metal cushion allowing for a normal expansion and contraction of the crystal.

5. A method according to claim 1, further comprising:
   positioning a pair of ceramic holders on opposing sides of the active optical crystal and in contact with at least one of the wall structures, the pair of ceramic holders positioned such that heat can flow from the crystal into the pair of ceramic holders in a direction that is substantially orthogonal to the direction in which heat flows into the wall structures.

6. An electro-optical modulator module for use in a $CO_2$ laser system, comprising:
   an active optical crystal having an optical entrance end surface and an optical exit end surface;
   a pair of wall structures positioned on opposing sides of the active optical crystal and being in thermal contact with the optical crystal; and
   two parallel cooling passages in thermal contact with each of the pair of wall structures and positioned symmetrically with respect to the active crystal, each cooling passage capable of containing a flow of fluid for removing heat transferred from the crystal and wherein the two parallel cooling passages are arranged such that the fluid flows in opposing directions.

7. A module according to claim 6, wherein each of the wall structures is formed of a Beryllium Oxide (BeO) ceramic material.

8. A module according to claim 5, further comprising:
   a pair of ceramic holders aligned with the remaining sides of the crystal and in thermal contact therewith.

9. An electro-optical modulator module for use in a $CO_2$ laser system, comprising:
   an active optical crystal having an optical entrance end surface and an optical exit end surface;
   a pair of wall structures positioned on opposing sides of the active optical crystal and being in thermal contact with the optical crystal;
   at least one cooling passage in thermal contact with each of the pair of wall structures, each cooling passage capable of containing a flow of fluid for removing heat transferred from the crystal and wherein the fluid includes at least one corrosion inhibitor; and
   a pair of ceramic holders aligned with the remaining sides of the crystal and in thermal contact therewith.

10. An electro-optical modulator module for use in a $CO_2$ laser system, comprising;
    an active optical crystal having an optical entrance end surface and an optical exit end surface;
    a pair of wall structures positioned on opposing sides of the active optical crystal and being in thermal contact with the optical crystal wherein each of the wall structures is formed of a Beryllium Oxide (BeO) ceramic material; and
    at least one cooling passage in thermal contact with each of the pair of wall structures, each cooling passage capable of containing a flow of fluid for removing heat transferred from the crystal and wherein the fluid includes at least one corrosion inhibitor.

11. An electro-optical modulator module for use in a $CO_2$ laser system, comprising;
    an active optical crystal;
    a pair of electrodes electrically coupled to the crystal for delivering RF energy thereto;
    a pair of wall structures positioned on opposing sides of the active optical crystal and being in thermal contact with the optical crystal; and
    at least one cooling passage in thermal contact with each of the pair of wall structures, each cooling passage capable of containing a flow of fluid for removing heat transferred from the crystal and wherein the fluid has a high electrical resistivity to the RF energy delivered to the electrodes and is primarily composed of de-ionized water.

12. An electro-optical modulator module for use in a $CO_2$ laser system, comprising:
    an elongated active optical crystal, said crystal being rectangular in cross-section having first and second pairs of opposed sides;
    a pair of electrodes electrically coupled to first pair of sides of the crystal for delivering energy thereto;
    a first pair of dielectric members being in thermal contact with the second pair of sides of the crystal; and
    a second pair of U-shaped dielectric members aligned with the first pair of sides of the crystal and surrounding the electrodes and being in thermal contact with the first pair of dielectric members, said first and second pairs of dielectric members being configured to provide a path for heat conduction away from the crystal during operation.

13. A module according to claim 12, wherein the dielectric members are formed of a Beryllium Oxide (BeO) material.

14. A module according to claim 6, wherein the fluid has a high electrical resistivity to RF energy.

15. A module as recited in claim 14, wherein the fluid is primarily composed of de-ionized water.

16. A module according to claim 8, further comprising:
a four walled metal housing for containing the active optical crystal, the pair of wall structures and pair of ceramic holders, the metal housing providing RF shielding for mode-locking operation.

17. A module according to claim 9, wherein the fluid has a high electrical resistivity to RF energy.

18. A module as recited in claim 17, wherein the fluid is primarily composed of de-ionized water.

19. A module according to claim 11, further comprising:
a pair of ceramic holders aligned with the remaining sides of the crystal and in thermal contact therewith.

20. A module according to claim 19, further comprising:
a four walled metal housing for containing the active optical crystal, the pair of wall structures and pair of ceramic holders, the metal housing providing RF shielding for mode-locking operation.

21. A module according to claim 12, wherein each of said U-shaped dielectric members includes at least one cooling passage carrying a flow of cooling liquid.

22. A module according to claim 21, wherein the fluid has a high electrical resistivity to the RF energy delivered to the electrodes.

23. A module as recited in claim 22, wherein the fluid is primarily composed of de-ionized water.

24. A module according to claim 12, further comprising:
a four walled metal housing for containing the active optical crystal, the pair of electrodes, and the first and second pairs of dielectric members, the metal housing providing RF shielding for mode-locking opera.

* * * * *